US008482880B2

(12) United States Patent  
Rubin et al.

(10) Patent No.: US 8,482,880 B2
(45) Date of Patent: Jul. 9, 2013

(54) PATTERNED STRUCTURE IN A STORAGE MEDIA

(75) Inventors: Kurt A. Rubin, San Jose, CA (US); Bernhard E. Knigge, San Jose, CA (US); Gabriel Zeltzer, Mountain View, CA (US); Elizabeth A. Dobisz, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 283 days.

(21) Appl. No.: 12/925,365

(22) Filed: Oct. 19, 2010

(65) Prior Publication Data  
US 2012/0092793 A1  Apr. 19, 2012

(51) Int. Cl.  
*G11B 5/82* (2006.01)

(52) U.S. Cl.  
USPC ........................................................ 360/135

(58) Field of Classification Search  
USPC ............. 360/135, 97.19, 97.13, 97.14, 97.12, 360/97.15, 97.16, 97.01; 430/270.13; 369/275.2, 275.4, 275.5  
See application file for complete search history.

(56) References Cited

U.S. PATENT DOCUMENTS

| | | | |
|---|---|---|---|
| 4,558,383 A | 12/1985 | Johnson | |
| 4,772,897 A * | 9/1988 | Ohkawa | 346/135.1 |
| 4,954,841 A * | 9/1990 | Ichihara et al. | 346/135.1 |
| 4,995,799 A * | 2/1991 | Hayashi et al. | 425/111 |
| 5,325,244 A | 6/1994 | Takano et al. | |
| 5,381,287 A | 1/1995 | Kawazoe et al. | |
| 5,488,519 A | 1/1996 | Ishida et al. | |
| 5,626,941 A | 5/1997 | Ouano | |
| 5,748,421 A | 5/1998 | Taki et al. | |
| 5,828,536 A | 10/1998 | Morita | |
| 6,088,200 A | 7/2000 | Morita | |
| 6,495,240 B1 | 12/2002 | Wada et al. | |
| 6,563,673 B2 | 5/2003 | Mundt et al. | |
| 6,908,725 B2 * | 6/2005 | Blankenbeckler et al. | 430/270.13 |
| 7,161,753 B2 | 1/2007 | Wachenschwanz et al. | |
| 7,164,548 B2 | 1/2007 | Hattori et al. | |
| 7,423,841 B2 | 9/2008 | Takai et al. | |
| 2002/0136984 A1 * | 9/2002 | Blankenbeckler et al. | 430/270.13 |
| 2005/0094311 A1 * | 5/2005 | Boss et al. | 360/97.01 |
| 2006/0238914 A1 * | 10/2006 | Xu | 360/97.01 |
| 2007/0169130 A1 * | 7/2007 | Wu | 720/600 |
| 2007/0171568 A1 * | 7/2007 | Boss et al. | 360/97.02 |
| 2009/0195932 A1 | 8/2009 | Zhang | |

FOREIGN PATENT DOCUMENTS

| | | | |
|---|---|---|---|
| JP | 7122018 A | 5/1995 | |
| JP | 10040540 A | 2/1998 | |

OTHER PUBLICATIONS

"Flying Characteristics on Discrete Track and Bit-Patterned Media With a Thermal Protrusion Slider", B. Knigge, et al. IEEE Trans. on Magnetics, vol. 44, No. 11, Nov. 2008.  
"Optimal Design of Slider Air-Bearing for Discrete Track Recording Technology", Sang-Joon Yoon, et al., IEEE Trans. on Magnetics, vol. 45, No. 5, May 2009.

* cited by examiner

*Primary Examiner* — Allen T Cao

(57) ABSTRACT

An embodiment of the invention provides an apparatus that includes: a storage media including a patterned structure, the patterned structure including a first groove, a first stopper in the first groove, wherein the first stopper is configured to interrupt the flow of gas in a section within the first groove.

7 Claims, 8 Drawing Sheets

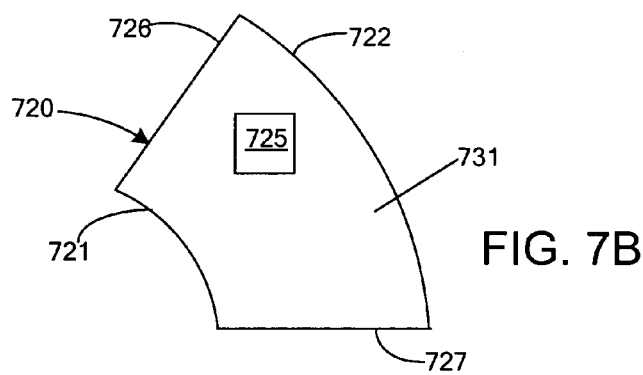
FIG. 7B
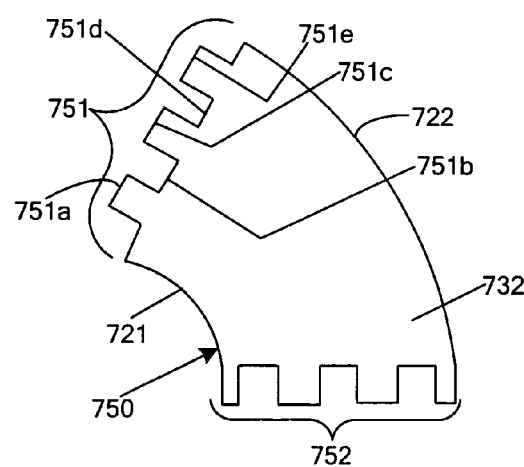
FIG. 7C
FIG. 7
| FIG. 7A |
| FIG. 7B |
| FIG. 7C |

PATTERNED STRUCTURE IN A STORAGE MEDIA

TECHNICAL FIELD

Embodiments of the invention relate generally to a patterned structure in a storage media.

BACKGROUND

Storage media is used for storing recorded data. One example of a storage media used for magnetic recording is a disk. Two types of disks that are used for magnetic recording of data are discrete track media (DTM) type disk and bit patterned media (BPM) type disk. Patterns that are formed on a DTM disk or BPM disk are grooves and lands. A groove (e.g., depressions or pits) has a top surface which is below the height of the original disk surface. A land has a top surface which is typically at the same height as the original disk surface.

A disk will have servo zones in which servo data is recorded, and data zones which are the data recording region. The servo data is used for guiding and controlling the position of the read-write slider (i.e., head) which is used for reading from and writing to the disk. For example, the servo data will maintain the position of the head along the center of the data track in the data zones of the disk and guide the head from one data track to another data track.

In a DTM disk, a data zone includes a set of parallel and concentrically-arranged lands, and a land is separated by parallel and concentrically-arranged grooves. Each data zone is between servo zones. The lands in the data zones and servo zones store magnetically recorded information.

In a BPM disk, multiple "bit islands", which may be lands in the shape of a square (or rectangles), are concentrically-arranged around the disk. The islands will store the magnetically recorded information in the form of bit values. The bit islands are separated by grooves in the disk and these grooves are non-magnetized areas that do not store information.

However, the topographic patterns (in the form of lands, grooves, or bit islands) on a disk will change the air flow between the slider and the disk. For example, in a DTM disk, the difference in the topographic pattern of a servo zone and the topographic pattern in a data zone will cause a change in the air flow under the slider as the slider is sequentially disposed from a data zone to a servo zone and vice versa. This change in air flow under the slider may cause the slider to move up and down (i.e., cause modulations in the slider flying height) when the disk moves under the slider. These slider flying height modulations typically will lead to magnetic spacing modulation which degrades the read and write performance of the slider, and also degrades the control of the slider because the slider is also trying to read the servo data.

Additionally, in a BPM disk, the bit islands can also vary in shape, positions, and number. These variations in the topography in a BPM disk can potentially lead to decreases and increases in the air flow that lead to slider flying height modulations.

Therefore, it is advantageous to reduce the modulations of the slider flying height and to reduce the air disturbances on the air bearing surface of the slider that flies over the disk.

SUMMARY

In one embodiment of the invention, an apparatus includes: a storage media including a patterned structure, the patterned structure including a first groove, a first stopper in the first groove, wherein the first stopper is configured to interrupt the flow of gas in a section within the first groove.

In another embodiment of the invention, a method includes: forming a magnetic layer on a substrate; forming a groove into the magnetic layer; and forming a plurality of stoppers coupled to a land comprising the magnetic layer.

In yet another embodiment of the invention, an apparatus includes: a storage media including a patterned structure, the patterned structure including: means for providing a flow of gas; and means for interrupting the flow of gas in a section within said providing means, said interrupting means configured within said providing means.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7B is a top view of a closed topological stopper in accordance with an embodiment of the invention.

FIG. 7C is a top view of a closed topological stopper in accordance with another embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Figure 1:
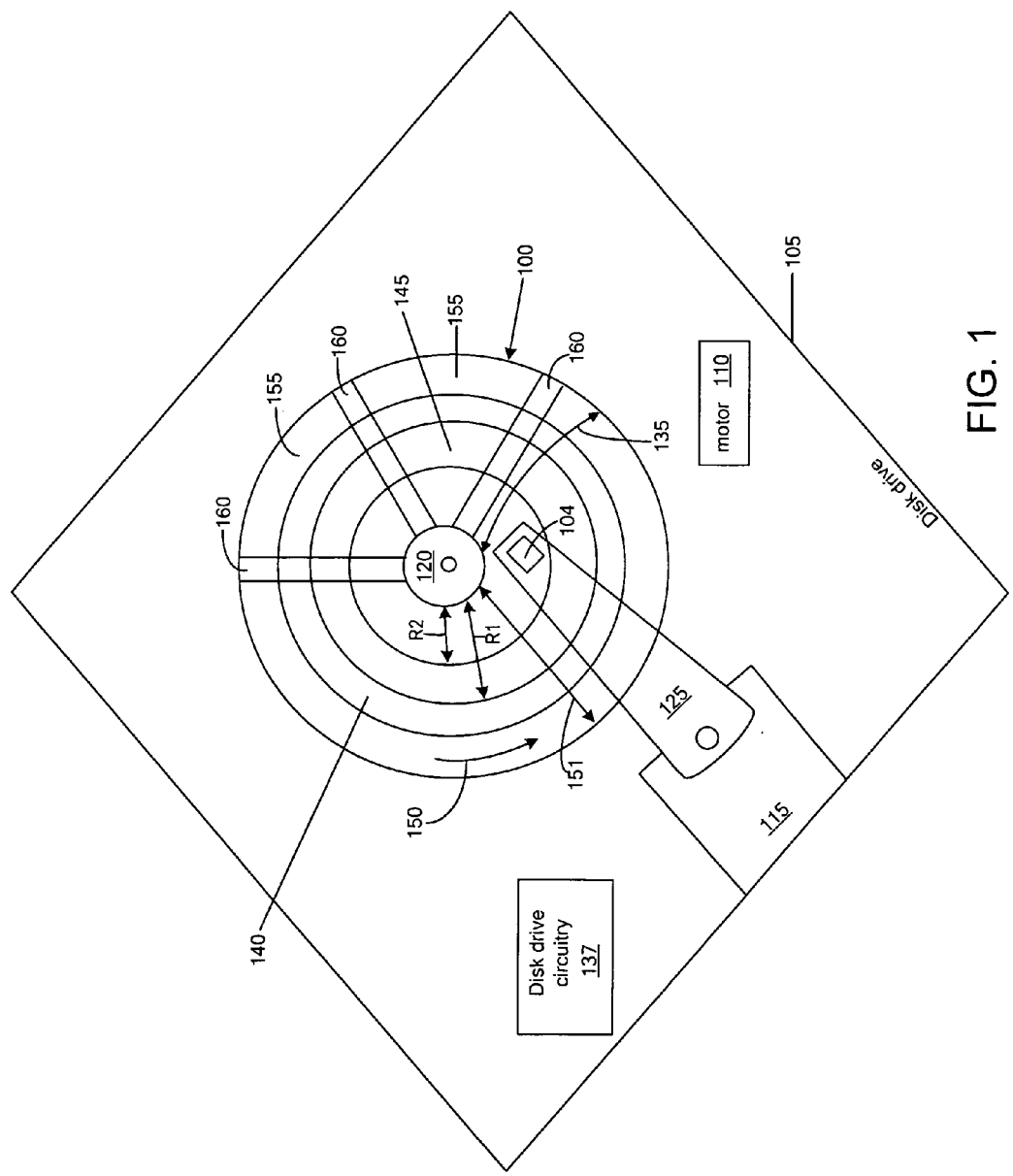
FIG. 1 is a block diagram of a disk in accordance with an embodiment of the invention.

FIG. 1 is a block diagram of a disk 100 in accordance with an embodiment of the invention. As will be discussed below in additional details, the disk 100 has a patterned structure that reduces gas disturbance (e.g., helium disturbance or air disturbance) on the air bearing surface of a slider (head) 104. An example disk drive 105 includes a motor 110 for rotationally driving (spinning) the disk 100. It is understood that one or more disks 100 can be stacked on the disk drive 105 along a disk mount 120 which can be, for example, a disk clamp. One example of the motor 110 is a spindle motor.

A mechanism 115 (which can include an additional motor) will position and rotate an arm 125 which is coupled to a slider 104. An example of the motor in the mechanism 115 is a voice coil motor (VCM). The motor will rotate the arm 125 so that the slider 104 moves along an arc path 135. As a result, the slider 104 is positioned along data tracks on the disk 100. Disk drive circuitry 137 on the disk drive 105 will allow the slider 104 to read data from and write data to the disk 100. Other components in the disk drive 100 are known to those skilled in the art.

In FIG. 1, the data tracks 140 and 145 are shown as example data tracks and are concentric with the disk 100 along the downtrack direction 150. The downtrack direction 150 will also be referred to in the discussion below as a circumferential direction 150. The number of data tracks on a disk 100 may vary. The data track 140 is at a particular radial distance in a radial direction R1 from the disk mount 120, while the data track 145 is at another particular radial distance in a radial direction R2 from the disk mount 120. The radial direction 151 is also commonly-known as a cross-track direction 151 which is a direction that crosses one or more data tracks on the disk. The width of a data track (e.g., tracks 140 or 145) is aligned along the radial direction 151. In contrast, the downtrack direction 150 will be concentric along any particular data track.

The disk 100 includes a plurality of data zones 155 which can store data. Any particular data zone 155 is between servo zones 160. As discussed above, the data zones 155 will store user data while the servo zones 160 will store servo data for controlling the slider movement and positioning. It is also noted that the shapes, scales, and sizes of the data zone 155 and servo zones 160 in FIG. 1 may vary.

Figure 2:
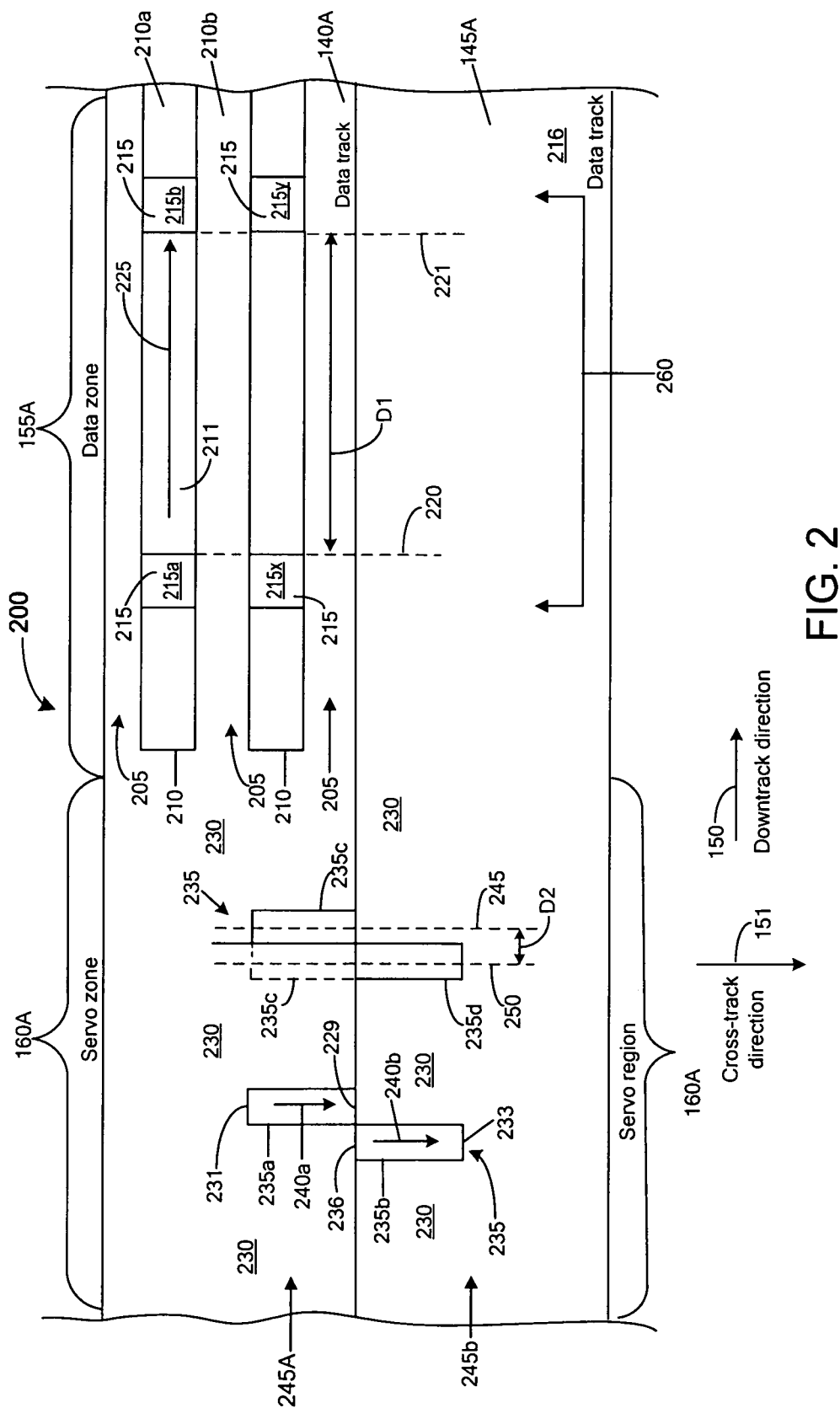
FIG. 2 is a block diagram of a top view of a patterned structure in accordance with an embodiment of the invention.

FIG. 2 is a block diagram of a top view of a patterned structure 200 in accordance with an embodiment of the invention. The patterned disk structures discussed herein can be formed on a disk 100 (FIG. 1). Only two example data tracks 104A and 145B are shown for purposes of discussion of a patterned structure for reducing gas disturbance (e.g., helium disturbance or air disturbance) on the air bearing surface of a slider 104 (FIG. 1) as the slider 104 flies over a disk. It is understood by those skilled in the art that a data zone and a servo zone will have multiple tracks and multiple grooves and lands that form surface patterns or irregularities on a disk surface 216. It is also understood by those skilled in the art that the patterned structure of FIG. 2 are example patterns on a data track media (DTM) type disk.

In the data zone 155A of the disk, data zone lands 205 are separated by data zone grooves 210. The drawings herein illustrate lands 205 and grooves 210 as linear for the sake of clarity. The lands 205 are used for storing data by magnetic recording and the grooves 210 serve as guard-bands for preventing crosstalk or noise between the lands 205. Typically, the lands and grooves are circular or substantially circular and concentric with the disk 100 (FIG. 1) which is also substantially circular. The data lands 205 can be arc segments, which are interrupted by servo regions (e.g., servo region 160A). Typically, the lands 205 are at a height of the disk surface 216 and the grooves 210 are at a surface level (height) that is below the height of the disk surface 216. The lands 205 may have a small variation in height due to roughness from the process of preparing them.

In an embodiment, flow stoppers (generally shown as reference number 215) are disposed in the grooves 210. As a result, two adjacent stoppers (e.g., stoppers 215a and 215b) will form (or define) a groove region (section) 211 between the adjacent stoppers. Typically, the groove region 211 between the stoppers is partially filled with a non-magnetic material. The top surface of a groove region 211 is typically recessed below the surface of the disk land 205.

In practice, due to manufacturing tolerances there may be situations where, on some disks, the land surface is slightly below the groove 210 top surface. In other words the groove 210 top surface may actually protrude slightly above the land surface. As long as the protrusion does not significantly reduce the magnetic spacing enough to materially degrade the magnetic read/write performance, this may be acceptable for the drive to function with acceptable read/write performance. For instance, the groove might extend one to five angstroms above the land surface. However, to minimize the effect on magnetic read write surface, it would be preferable for the groove top surface to be at or slightly below the surface of the disk land.

In the embodiment shown in FIG. 2, the stoppers 215 are aligned in a radial axis (e.g., stopper 215a in first groove 210a and stopper 215x in second groove 210b are both aligned with the radial axis 220, while stopper 215b in first groove 210a and stopper 215y in second groove 210b are both aligned with the radial axis 221). In other embodiments to be discussed below, the stoppers in parallel grooves are laterally offset from other stoppers (FIG. 4), or the stoppers in one data track are laterally offset from the stoppers in other data tracks (FIG. 5).

The stoppers 215 in the grooves 210 are arranged substantially concentrically around the disk. Each stopper 215 is coupled to (or, alternatively, may be contiguous with or connected to) the adjacent lands 205 in the substantially downtrack direction 150 and defines the length of a groove segment 211 in the downtrack direction 150. The data zone stoppers 215 would interrupt the flow of gas in the downtrack direction 150 (or substantially downtrack direction 150). This flow of gas can be, for example, a flow of helium, a flow or air, or a flow of another suitable type of gas. As an example, a stopper 215 is approximately 5 nanometers to approximately 200 nanometers in length in the downtrack direction 150. A width of a groove is, for example, approximately 40 nanometers and has a depth of, for example, 20 nanometers. A stopper 215 will span the entire width of the groove and be in contact with the lands 205 (or is integrated with or contiguous with the lands 205).

As an example, the groove segment 211 provides or contains a flow of gas 225 (e.g., helium, air, or another gas type). The stoppers 215a and 215b are disposed in (or configured in) the groove 210 in order to define the groove segment 211. The stoppers 215a and 215b will reduce (or substantially block or interrupt) the flow of gas 225 in the groove segment 211, where the gas 225 flows parallel to the disk surface 216 in the downtrack direction 150. As will be discussed below in additional details with reference to FIG. 3, this blocking of the gas flow will advantageously reduce the modulation (i.e., variation or up-and-down-movement) of the fly height of the slider 104. Other stoppers 215 will reduce the flow of the gas 225 (or substantially block or interrupt the flow of the gas 225) along the segments 211. As a result of this reduction of the flow of gas 225 in the segments 211, the slider fly height modulation is decreased because gas is substantially unable to flow to the side (cross track direction 151) or to the rear (downtrack direction 150) of the slider, as will be discussed further below.

The distance between stoppers 215 in a groove 210 is set by the distance D1 which is typically less than the characteristic dimension or length of the pressure peak region on the air bearing surface of a slider. For example, the distance D1 between the stoppers 215a and 215b is less than approximately 100 micron meters because in current typical air bearing surface design, the pressure peak region has a characteristic dimension of less than approximate 100×100 micron meters (i.e., less than approximately 100 micron meters in length (down-track direction) and less than approximately 100 micron meters in width (cross track direction)). As another example, the distance D1 is approximately 40 micron meters or less. It is understood by those skilled in the art that this distance D1 can change approximate values as the state of technology advances.

The magnetic layers that are part of the stoppers may be magnetically initialized into one direction. This might be done to reduce magnetic noise. A way to do this is with a strong external magnet or as part of a drive initialization operation. This initializing could either involve DC initializing into one direction, or AC erasing into a highly randomized magnetic state. This could be done as part of the process of building the disk by applying a strong magnetic field perpendicular to the disk or insitu in the drive.

Although the lands 205 and grooves 210 are only shown in the data track 140A for purposes of discussion, it is understood that the data track 145A also has lands 205 and grooves 210, and stoppers 215.

In the servo zone 160A of the disk, servo zone lands 230 are separated by servo zone grooves which are shown generally as grooves 235. Typically, the lands 230 are also at the height of the disk surface 216 and the grooves 235 are at a height (surface level) that is below the height of the disk surface 216. The servo zone lands 230 also include a magnetic layer for storing magnetically recorded servo data. Typically, a groove 235 is partially filled with a non-magnetic material. The top surface of a groove region 235 is recessed below the surface of the disk servo land 230.

In an embodiment, the servo zone code (i.e., servo zone surface pattern) is shifted downtrack 150 for selected tracks. This shift of the servo zone code in selected data tracks will reduce (or interrupt or substantially block) the cross-track gas flow and yet not change a significant aspect of the servo zone architecture or patterns. As an example, the shift in the servo zone code in selected tracks is accomplished in the design of the patterning the lithographic template for forming the servo zones.

As a result of a shifting of servo zone code 245a in the cross track direction 150, the flow of gas 240a in groove segment 235a is reduced (or substantially blocked or interrupted) by the wall 229 of land 230 of the adjacent data track 145A and wall 231 of land 230 of the data track 140A. The flow of gas 240a is reduced in the substantially cross track direction 151 (or substantially cross track direction 151) by the wall 229. Therefore, the walls 229 and 231 are servo zone stoppers that reduce (or substantially block or interrupt) the flow in the cross-track direction 151 of gas 240a in groove segment 235a. Similarly, the cross-track flow of gas 240b in groove segment 235b is reduced (or substantially blocked or interrupted) by the wall 233 of land 230 of the data track 145A and wall 236 of land 230 of the adjacent data track 140A.

In order to discuss additional details on the shifting of the servo zone code for particular data tracks, assume in the example of FIG. 2 that the servo zone code 245a of data track 140A will be shifted in the downtrack direction 150 with respect to the servo zoned code 245b of data track 145A which is adjacent to the data track 140A. The amount of shift is typically, for example, a small number of clocks (T) which amount toeless than, for example, approximately 5 micron meters. Other suitable shift amounts may be applied to a servo zone code. Prior to the shift of the servo zone code 245a in the downtrack direction 150, the groove segment 235c (in servo zone code 245a) is aligned along the radial axis 250 with the groove segment 235d. The groove segment 235c is shown by dashed lines in the servo zone code 245b, prior to the shift. After shifting the servo zone code 245a in the downtrack direction 150, the groove segments 235c and 235d are now offset and are no longer aligned in the axis 245. Instead, the groove segment 235c is shown as aligned in the radial axis 245. The downtrack distance D2 between the axis 245 and axis 250 indicates the amount of shift of the servo zone code 245a in the downtrack direction 150.

Note that the servo zone lands 230 and grooves 235 are typically not completely radial in direction. Instead, the servo zone lands 235 and grooves 235 are typically substantially radial in direction by being parallel to the arc direction 135 (FIG. 1) of the slider 104 movement. The servo zone lands 230 and grooves 235 may typically have a few degrees in bending from a straight radial direction. Since the servo zone stoppers (e.g., stoppers or walls 229 and 231) reduce (or substantially block or interrupt) the flow of gas in the cross-track direction 151, the gas that squeezes through from the side of the air bearing surface of the slider 104 is advantageously not increased.

In an embodiment of the invention, the data zone stoppers, the data zone lands, and the servo zone lands are of the same height which is the height of the disk surface 216. As a result, the stoppers, data zone lands, and servo zone lands can be formed and shaped during the same process steps. The stoppers are typically rigidly part of the lands in the patterns of the disk structure that is moving under the high pressure region in the slider air bearing surface.

Figure 3:
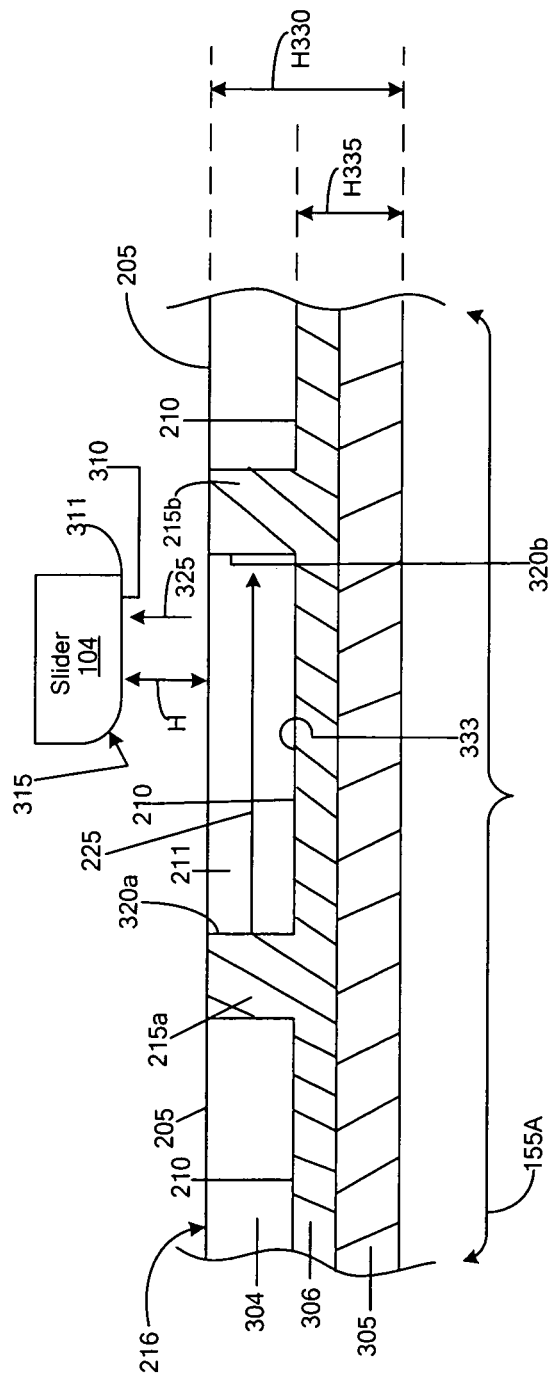
FIG. 3 is a block diagram of a cross sectional view of a patterned structure in a data zone, in accordance with an embodiment of the invention.

FIG. 3 is a block diagram of a cross sectional view of a patterned structure in a data zone 155A, in accordance with an embodiment of the invention. FIG. 3 is viewed in the direction of arrow 260 of FIG. 2. A substrate 305 is formed from, for example, glass, synthetic resin, aluminum, aluminum alloy, or other suitable non-magnetic materials. A magnetic layer 304 is then formed on the substrate 305. The magnetic layer structure is formed from material that is, for example, sputtered, ion plated, vapor metal deposited, or otherwise formed on the substrate 305. This magnetic layer structure is, for example, thin films that are formed on the substrate 305. This magnetic layer can be material such as, for example, ferromagnetic metals such as Co alloys or Fe alloys, CoPat alloys, CoCrPt alloys and FePt alloys, can be magnetic metals in which non-magnetic materials are interspersed or can be other magnetic materials. A lithographic step or other suitable etching step is then performed on the depth of the magnetic material in order to form the groove 210, land 205, and data zone stoppers 215a and 215b. In this embodiment, the data zone stoppers 215a and 215b are contiguous with the land 205. A layer 306 of the magnetic material 304 may remain on the substrate 305 after the lithographic step is performed on the magnetic material 304 to form the groove 210 and stoppers 215a and 215b. In another embodiment, a non-magnetic material 333 may deposited on the surface of the groove 210 (and on the surface of the section 211 between the stoppers 215a and 215b).

In another embodiment, the lithographic step will form the groove 210. The stoppers 215a and 215b are then formed on the groove 210 between the lands 205. In this embodiment, the stoppers 215a and 215b are formed by, for example, depositing the materials for the stoppers 215a and 215b into the groove 210. The stoppers 215a and 215b are in contact with or coupled to the lands 205.

As shown in FIG. 3, the stoppers 215a and 215b and land 210 are at the same height H330. The groove 210 is at a height H335 which is lower than the height H330.

Those skilled in the art will realize that other suitable layers may be added in FIG. 3. For example, a protective layer of thin film (not shown in FIG. 3) may be formed on the magnetic layer.

With continuing reference to FIG. 3, the slider 104 will have a high pressure zone (pressure peak zone) 310 at the trailing edge 311 of the air bearing surface (or gas bearing surface) 315, as measured in device test procedures. Typically, a slider 104 will have a relatively larger size such as, for example, less than approximately 1 millimeter in width and less than approximately 1 in length. Typically, the high pressure zone 310 has a size in the order of, for example, approximately 40 micron-meters by 40 micron-meters. Typically, but not in all cases, the high pressure zone 310 is in the center area of the trailing edge 311. Therefore, the size scale of the high pressure zone 310 is much smaller than the total air bearing surface area 315. This high pressure zone is more sensitive to changes in the gas flow due to the topography of the patterns on the disk surface 216. The highest pressure value in the high pressure zone 310 has been measured at, for example, approximately 9 atmospheres or greater.

The walls 320a and 320b (of stoppers 215a and 215b, respectively) will act as barriers to the flow of gas 225 within the groove segment 211. These stoppers 215a and 215b will reduce the excitation of flow of gas 225, and therefore reduce the modulation of fly height H as the disk spins (or moves) under the stationary slider 104.

The multiple various stoppers 215 (FIG. 2) that are in the data zone 155A will interrupt or reduce the downtrack direction 150 flow of gas 225. Since the flow of gas 225 is interrupted or reduced in the data zone 155A, the gas pressure 325 underneath the air bearing surface 315 is made more even. As a result, the fly height H of the slider 104 is evened out (i.e., reduced in modulation).

To further reduce the modulation of the fly height H, a damping air bearing surface can be used for the slider 104. A slider 104 can have a damping surface based on, for example, the structural shape or features of the surface 315 or slider 104 to damp the gas pressure as is known to those skilled in the art.

To further reduce the modulation of the fly height H, an active damping feature can be used with the slider 104. For example, an active damping feature can include a vibration control system as known to those skilled in the art. This active damping feature can be included in, for example, the disk drive circuitry (FIG. 1) and/or disk drive mechanism 115 (FIG. 1).

Figure 4:
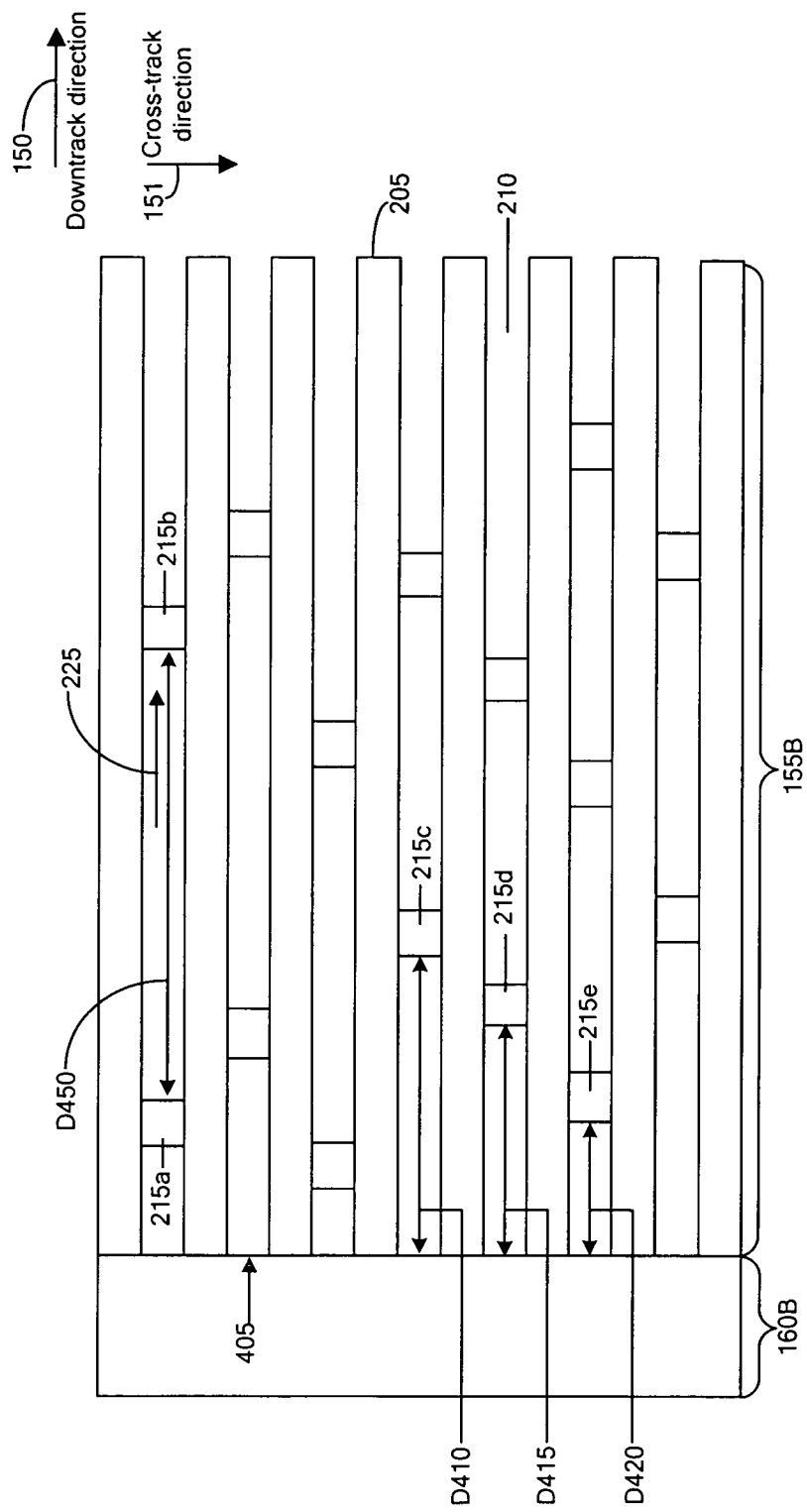
FIG. 4 is a block diagram of a top view of a patterned structure in accordance with another embodiment of the invention.
Figure 5:
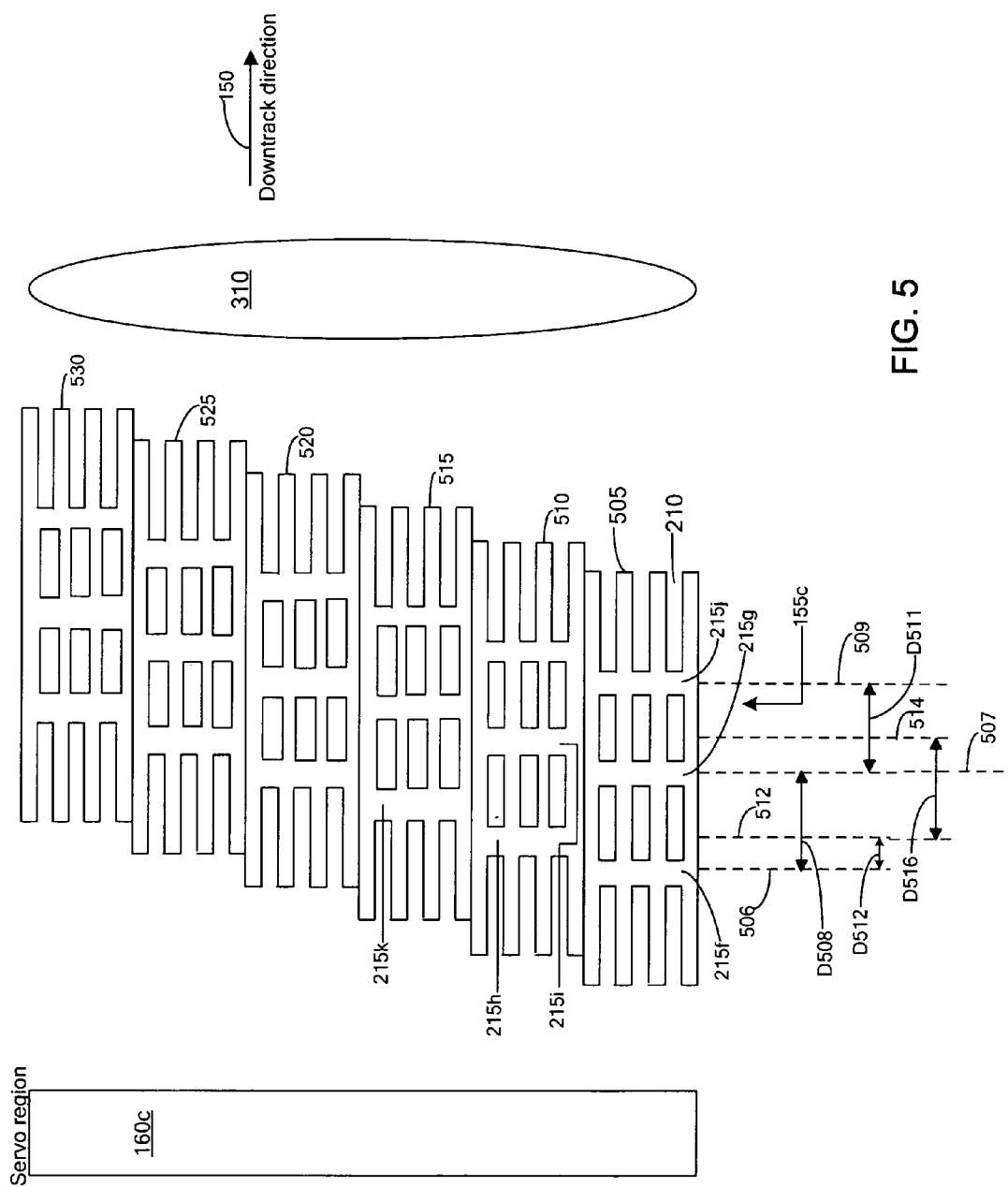
FIG. 5 is a block diagram of a top view of a patterned structure in accordance with another embodiment of the invention.

FIG. 4 is a block diagram of a top view of a patterned structure in a data zone 155B, in accordance with another embodiment of the invention. The stoppers 215 in parallel grooves 210 are laterally offset from other stoppers 215. For example, the stopper 215c is at an offset distance D410 from the servo zone boundary 405; the stopper 215d is at an offset distance D415 from the servo zone boundary 405; and the stopper 215e is at an offset distance D420 from the servo zone boundary 405, where the following distances will differ in value: D420>D410>D415. As a result, the stoppers 215c, 215d, and 215e are laterally offset from each other due to their respective offset distances from the servo zone boundary 405. Therefore, the stoppers are randomly positioned in the radial direction 151 (FIG. 1), but the distance D450 between a pair of adjacent stoppers (e.g., stoppers 215a and 215b) in the same groove 210 are substantially similar in accordance with one embodiment of the invention.

Due to the offset of the stoppers 215, the flow interruption of the downtrack direction 150 flow of gas 225 will vary in location, for each groove 210 in the data zone 155B. Therefore, the flow interruption of gas 225 is more evenly distributed in the data zone 155B. As a result, the perpendicular pressure 325 (FIG. 3) is reduced in a more even distribution in the data zone 155B and the reduction of the perpendicular pressure 325 is not concentrated in particular specific areas of the data zone 155B.

FIG. 5 is a block diagram of a top view of a patterned structure in a data zone 155C, in accordance with another embodiment of the invention. The stoppers 215f in one data track 505 are vertically aligned along a radial axis 506 and the stoppers 215g in the same data track 505 are vertically aligned along a radial axis 507. The axis 506 and axis 507 are separated by a fixed distance (constant distance) D508. Additional stoppers can be placed in the track 505. For example, the stoppers 215j are vertically aligned along a radial axis 509. The axis 509 and axis 507 are separated by a fixed distance D511 which is equal to the fixed distance D508. Therefore, adjacent stoppers pair (e.g., stoppers pair 215f/215g or stoppers pair 215g/215j) are separated by the same constant fixed distance D508=D511 in the same track 505. Therefore, each pair of adjacent stopper is separated by the constant spacing value D508, except for the stoppers that are adjacent to the servo zone on each side of the data zone.

The stoppers 215h in a data track 510 (which is adjacent to track 505) are vertically aligned along a radial axis 512 and the stoppers 215i in the same data track 510 are vertically aligned along a radial axis 514. The axis 512 and axis 514 are separated by a fixed constant distance D516 which is also equal to the fixed constant distance D508 or D511 (i.e., distance D516=D508=D511). The axis 512 is offset in the downtrack direction 150 from the axis 506 by an offset distance D512. Therefore, the stoppers 215h/215i in track 510 are offset in the downtrack direction 150 from the stoppers 215f/215g in track 505 by the distance D512.

Other tracks 515, 520, 525, and 530 are also offset in the downtrack direction 150 as shown in FIG. 5. Therefore, as an example, the stoppers 215k in data track 515 are offset in the downtrack direction 150 from the stoppers 215h by a distance equal to the offset distance D512. Due to the staggered positions of the offset stoppers, the gas 225 is blocked (or interrupted) in a staggered manner along the data zone 155C for different data tracks. As a result, the perpendicular pressure 325 (FIG. 3) is reduced in a more even distribution in the data zone 155C and the reduction of the perpendicular pressure 325 is not concentrated in particular specific areas of the data zone 155C.

Figure 6:
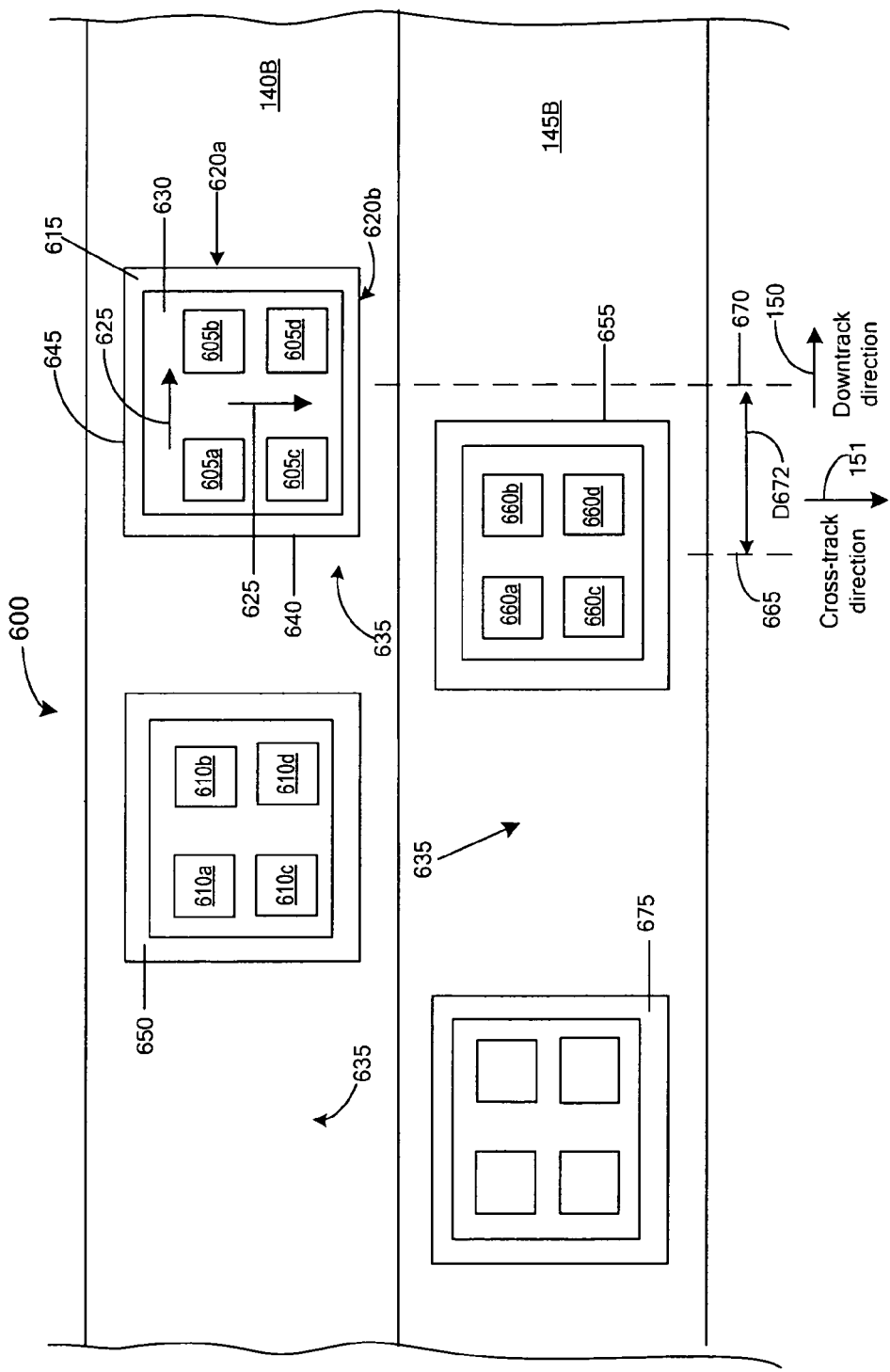
FIG. 6 is a block diagram of a top view of a patterned structure in a bit patterned media (BPM), in accordance with another embodiment of the invention.

FIG. 6 is a block diagram of a top view of a patterned structure in a bit patterned media (BPM) 600, in accordance with another embodiment of the invention. In an embodiment of the invention as shown in the example of FIG. 6, closed topological stoppers are spaced apart along the data tracks 140B and 145B. In another embodiment of the invention as will be discussed below with reference to the examples of FIGS. 7A-7C, the closed topological stoppers are adjacent or substantially adjacent to each other along the data tracks.

The BPM 600 (FIG. 6) may be the disk type for the disk 100 (FIG. 1). In a BPM, bit islands will typically have a magnetic layer near the top surface and will store bit values of the magnetically recorded data. In the example of FIG. 6, the data track 140B has the bit islands 605a-605d and 610a-610d. In an embodiment, a first closed topological stopper 615 surrounds the bit islands 605a-605d. There can be many islands surrounded by the closed topological stopper. In the discussion herein, a closed topological stopper may alternatively be referred to as a "closed stopper" or "closed stopper topology". The bit islands 605a-605d are on a groove section 630 which has a height that is below the height of a bit island. The closed topological stopper 615 surrounds the groove section 630 also. Outside of the closed topological stopper 615 is a groove 635 which has a height that is the same as the height of the groove section 630. The example stoppers in FIG. 6 are shown as substantially square in shape for purposes of discussion. However, the stoppers may have other shapes such as, e.g., rectangular, or concentric curved edges (as shown in FIG. 7B or 7C) or other suitable configurations.

As an example, the closed topological stopper 615 has a first stopper wall 620a which is a wall for interrupting the flow of gas 625 in the substantially downtrack direction 150 within the groove section 630. The closed topological stopper 615 also has a second stopper wall 620b which is a wall for interrupting the flow of gas 625 in the substantially crosstrack direction 151 within the groove section 630. The other wall 640 of the closed topological stopper 615 will also interrupt the gas flow in a direction opposite to the downtrack direction 150, and the wall 645 of the closed topological stopper 615 will interrupt the gas flow in a direction opposite to the cross-track direction 150. The walls of the closed topological stopper 615 are typically contiguous or integrated. However, the walls of the closed topological stopper 615 can also be formed in separate process steps.

A closed topological stopper has a characteristic size which is typically smaller in size than (or equal to) the characteristic length of the high pressure region 310 (FIGS. 3 and 5) of the slider air bearing surface. Typically, the closed topological stopper size is less than, for example, approximately 40 micron meters×40 micron meters or approximately 30×30 micron meters. By limiting the size of the closed topological stopper to the length of the high pressure region 310 or a lesser length, the lift (perpendicular force) from the groove segment 630 within a closed topological stopper is reduced. As a result, the modulation of the slider fly height is reduced.

Figure 7A:
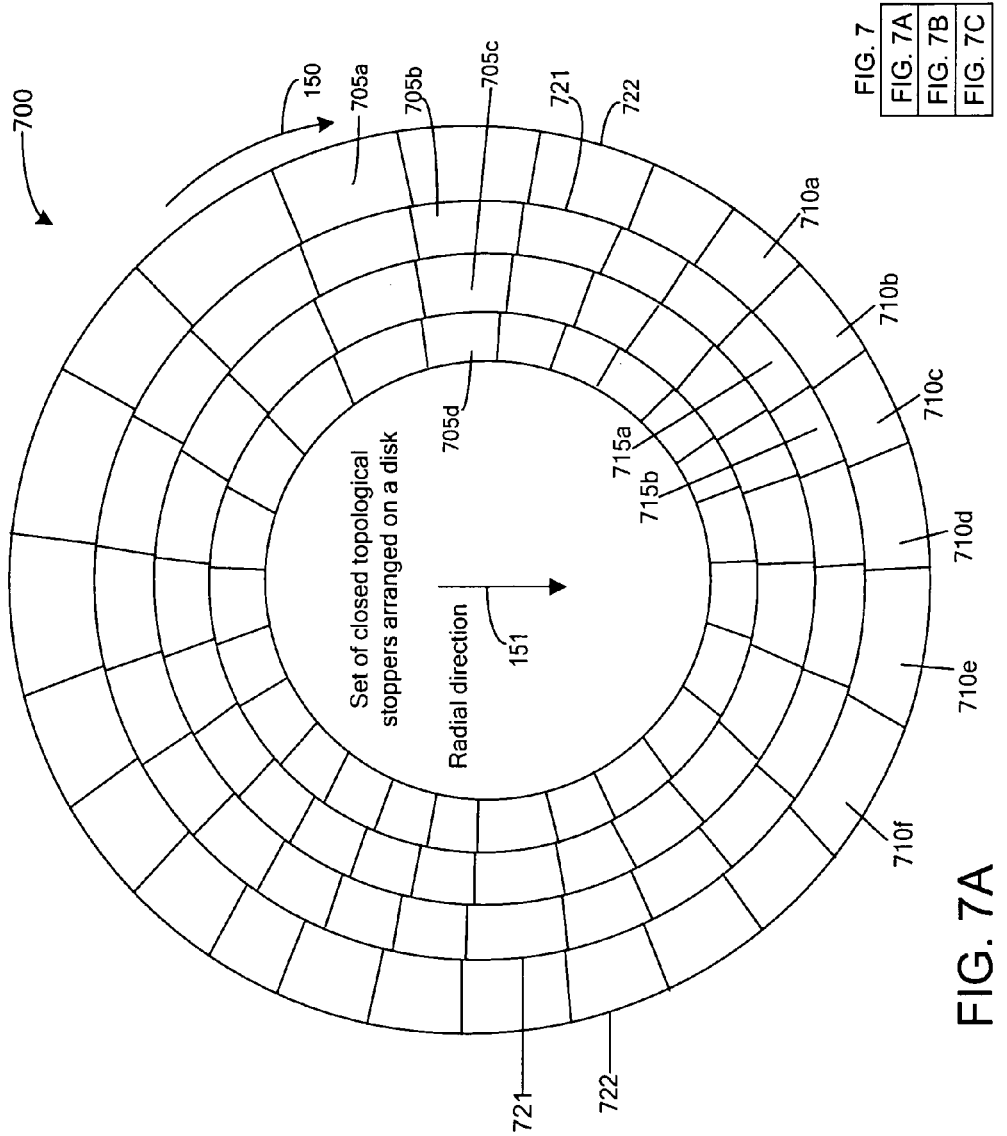
FIG. 7A is a top view of a patterned structure in a bit patterned media (BPM), in accordance with another embodiment of the invention.

Reference is now made to the BPM 700 of FIG. 7A in accordance with another embodiment of the invention. Each of the data tracks 705a-705d on the BPM 700 includes a set of closed topological stoppers that are adjacent to each other or substantially adjacent to each other. For example, closed topological stoppers 710a-710f (and additional stoppers) are aligned in series along the data track 705a. The stoppers are adjacent or substantially adjacent to each other. For example, stopper 710b is adjacent to stoppers 710a and 710c in the data track 705a and is also adjacent to the stoppers 715a and 715b in the data track 705b.

Reference is now made to FIG. 7B which is a top view of a closed topological stopper 720 in accordance with an embodiment of the invention. Note that the stoppers 720 of FIG. 7B and stoppers 750 of FIG. 7C can be arranged in a circumferential manner on the BPM 700 as shown in FIG. 7A. A more general shape for the stopper region for BPM storage media is a topologically closed curve as shown by the stopper 720 (FIG. 7B). The stopper 720 included two edges 721 and 722 that are curved arcs that are concentric with the circumferential direction 150 (FIG. 7A) of the BPM 700. As also discussed above, one or more BMP islands 725 are surrounded by the edges 721-722 and edges 726-727 of a stopper 720. By not having gaps in the stopper 720, gas flow is reduced (or interrupted) from one closed curve (e.g., edge 722) to the next closed curve (e.g., edge 721) within (inside of) the stopper 720. One embodiment of the closed curve stopper 700 is a closed arc segment topology in which there are two concentric arcs (edges 721 and 722) that run circumferentially along the disk and the curve (e.g., arc 721) is closed by a radially oriented stopper (edge 726) separated from the other edge (727) by a distance less than the length of the high pressure region of the air-bearing slider. Each of the edges 726 and 727 are radially aligned along the radial direction 151 (FIG. 7A) and are substantially straight in edge shape. These edges 726 and 727 interrupt the flow of gas along the downtrack direction 150 within (inside of) the stopper 720. Note also that in FIG. 7A, the concentric edges 721 and 722 are more clearly illustrated as spanning the BMP 700 circumferentially.

Reference is now made to FIG. 7C which is a top view of a closed topological stopper 750 in accordance with another embodiment of the invention. The stopper 705 includes the curved arcs 721 and 722, as similarly discussed above, and the edges 751 and 752 that form the closure with arcs 721 and 722. Each of the edges 751 and 752 has a radially dependent position variation that can interlock. This variation will advantageously, for example, allow tiling of the disk or media surface. In the example of FIG. 7C, the edge sections 751a, 751c, and 751e are radially aligned in the radial direction 151. The edge sections 751b and 751d are radially aligned in the radial direction 151. However, each of the edge sections 751a, 751c, and 751e are laterally offset in the circumferential direction 150 from each of the edge sections 751b and 751d as shown in FIG. 7C. As a result, each of the edges 751 and 752 has edge sections that alternate between an offset position (as with, e.g., section 751a) and a non-offset position (as with, e.g., section 751b. The edges 751 and 752 are un-even edges as best shown in the FIG. 7C example, or can also be jagged edges. As similarly discussed above, the edges 751 and 752 (as well as the edges 721 and 722) will interrupt the flow of gas within (inside of) the stopper 750.

By tiling, a set of shapes are similar, with the boundary of which are represented by the area enclosed by the topologically closed stopper. To tile the disk, the shapes may be translated and/or rotated with respect to each other. If the disk was shaped as a rectangle, this would be simply a translation in two directions, e.g. x and y. But a disk is shaped as a circle, and so in order to perform this tiling, one also rotates the shape as one traverses a circumferential arc of a constant radius. As one translates to larger radius, one inserts either one or more extra shapes or makes the shape larger in the circumferential direction. In other words, it is not necessary that all the shapes be identical when tiling the disk surface. By tiling much of the disk surface, the areal efficiency of the disk is increased, or in other words, little or none of the area of the disk that is accessible by the slider is left unused for either data storage or servo functionality while at the same time the fly height modulation is minimized by having closed topological boundaries distributed across the disk surface.

To perform the tiling, it is only typical that the shapes abut next to one another. However, by adding a staggered shape to the edges of the closed topological stopper, the performance of the closed topological boundary can be improved, and it ensures that as the high pressure region under the ABS on the slider translates over the closed topological stopper, this region does not encounter all of the stoppers at the same time.

Thus by staggering the edge, there is a series of smaller transitions that the ABS encounters. In this way the excitation of the slider by passing over the closed topological stopper is reduced, thus reducing the fly height modulation of the slider.

A non-magnetic material may also be formed on the groove section 630 (FIG. 6), on the groove section 731 (within stopper 720 of FIG. 7B), and on the groove section 732 (within stopper 750 in FIG. 7C), in order to prevent cross-talk or magnetic noise between the bit islands. In addition, the magnetic material on the blockage (stopper) can be initialized into a known magnetic state to reduce magnetic noise. This could either be DC initialized into one direction, or AC erased into a highly randomized magnetic state. This could be done as part of the process of building the disk by applying a strong magnetic field perpendicular to the disk or insitu in the drive.

Reference is again made to FIG. 6 for purposes of discussing the interruption of the gas flow by the closed topological stoppers in a more even distribution, in accordance with an embodiment of the invention. The circumferential position of the closed topological stoppers shifts in the downtrack direction 150, depending on the radial position of the data track with the closed topological stoppers. For example, in FIG. 6, a second closed topological stopper 655 (in the data track 145) surrounds the bit islands 660a-660d and is aligned with the radial axis 665. The first closed topological stopper 615 (in data track 140B) is aligned with the radial axis 670. The first closed topological stopper 615 is offset from the second closed topological stopper 655 by an offset distance D672 in a substantially downtrack direction 150.

Similarly, the closed topological stopper 650 (in data track 140B) is offset from a closed topological stopper 675 (in data track 145B) by an offset distance that is equal to distance D672 in a substantially downtrack direction 150. Due to the staggered positions of the closed topological stoppers, gas flow is interrupted in a more even distribution on the disk or media. As a result, the perpendicular pressure 325 (FIG. 3) is reduced in a more even distribution in the disk and the reduction of the perpendicular pressure 325 is not concentrated in particular specific areas of the disk. It is noted that the staggered positions of the stoppers in the BPM 700 of FIG. 7A also permits this interruption of gas flow in a more even distribution on the media.

The stoppers can be used with a storage device in which the gas used to enable the air bearing slider to fly is air or some other gas.

In another embodiment of the invention, in order to achieve a gradual transition of the land-to-groove ratio (i.e., land-to-valley ratio) between the data zone and the servo zone, the land-to-groove ratio in the servo zones can be increased. For example, land-to-groove ratio in the servo zones can be increased by increasing the area of the lands and/or decreasing the area of the grooves in the servo zones. As a further example, the area of the grooves can be decreased by narrowing the groove size. This gradual transition of the land-to-groove ratio can advantageously further reduce the disturbance on the head as the head moves between data zones and servo zones and vice versa. In the case of BPM media this can be accomplished by changing the size and shape of the BPM island.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for a storage media comprising:
   a plurality of bit islands in a first groove; and
   a topology comprising a first closed topology stopper surrounding the plurality of bit islands;
   wherein the first closed topology stopper topologically includes a first edge for interrupting gas flow along a substantially downtrack direction and a second edge for interrupting gas flow in a substantially crosstrack direction.

2. The apparatus of claim 1, further comprising:
   a first data track having the first closed topology stopper;
   a second closed topology stopper; and
   a second data track having the second closed topology stopper.

3. The apparatus of claim 1, wherein the first closed topology stopper is offset from the second closed topology stopper in a substantially downtrack direction.

4. The apparatus of claim 1, wherein a slider fly height modulation is reduced above the patterned structure by use of a damping air bearing surface.

5. The apparatus of claim 1, wherein a slider fly height modulation is reduced above the patterned structure by use of an active damping feature.

6. The apparatus of claim 1 wherein the first closed topology stopper comprises a pair of radially aligned straight edges.

7. The apparatus of claim 1, wherein the first closed topology stopper comprises a pair of radially aligned edges, with each edge having a radially dependent position variation.

* * * * *